(12) United States Patent
McCoy

(10) Patent No.: US 6,497,534 B1
(45) Date of Patent: Dec. 24, 2002

(54) REDUCTION OF SOIL CONTAMINATION

(75) Inventor: Charles McCoy, Reno, NV (US)

(73) Assignee: Dorothy A. Smith, Santa Barbara, CA (US)

( * ) Notice: Subject to any disclaimer, the term of this patent is extended or adjusted under 35 U.S.C. 154(b) by 0 days.

(21) Appl. No.: 09/896,586

(22) Filed: Jul. 2, 2001

(51) Int. Cl.[7] ................................................ B09B 3/00
(52) U.S. Cl. ............................ 405/128.5; 405/128.15; 405/128.45; 172/146; 172/151
(58) Field of Search ....................... 405/128.28, 128.45, 405/128.5, 128.15; 172/146, 151

(56) References Cited

U.S. PATENT DOCUMENTS

| | | | | |
|---|---|---|---|---|
| 2,138,904 A | * | 12/1938 | Carswell ..................... | 172/146 |
| 3,822,656 A | * | 7/1974 | Lalor .......................... | 111/14 |
| 4,331,204 A | * | 5/1982 | White .......................... | 172/112 |
| 4,361,191 A | * | 11/1982 | Landoll et al. ............. | 172/146 |
| 4,396,402 A | * | 8/1983 | Ghosh ........................ | 210/603 |
| 4,512,414 A | * | 4/1985 | Kuhn et al. ................ | 172/112 |
| 4,713,896 A | * | 12/1987 | Jennens ...................... | 114/312 |
| 4,990,025 A | * | 2/1991 | Young et al. ................ | 404/92 |
| 4,992,174 A | * | 2/1991 | Caplan et al. .............. | 166/266 |
| 5,037,240 A | * | 8/1991 | Sherman ................ | 405/128.15 |
| 5,039,415 A | | 8/1991 | Smith | |
| 5,120,160 A | * | 6/1992 | Schwengel ............. | 405/128.45 |
| 5,146,997 A | * | 9/1992 | Korin .......................... | 172/42 |
| 5,302,287 A | * | 4/1994 | Losack ........................ | 134/42 |
| 5,334,533 A | * | 8/1994 | Popat et al. ............. | 228/123.1 |
| 5,342,146 A | * | 8/1994 | Cooper ..................... | 405/128.7 |
| 5,368,411 A | * | 11/1994 | Losack ....................... | 134/40 |
| 5,803,664 A | * | 9/1998 | Kawabata et al. ........ | 166/246 |

* cited by examiner

Primary Examiner—Heather Shackelford
Assistant Examiner—Katherine Mitchell
(74) Attorney, Agent, or Firm—William W. Haefliger

(57) ABSTRACT

The method of treating hydrocarbon contamination, in soil, that includes providing and operating a rotary tiller having tilling elements that rotate into and out of the soil to till and loosen the soil, and to elevate soil upwardly so that loosened elevated soil then drops downwardly, and is aerated, and dispersing into the soil aqueous streams that contain microbes or chemicals characterized as reacting with hydrocarbon in the loosened soil to produce $CO_2$ and water, thereby to decontaminate the soil.

14 Claims, 7 Drawing Sheets

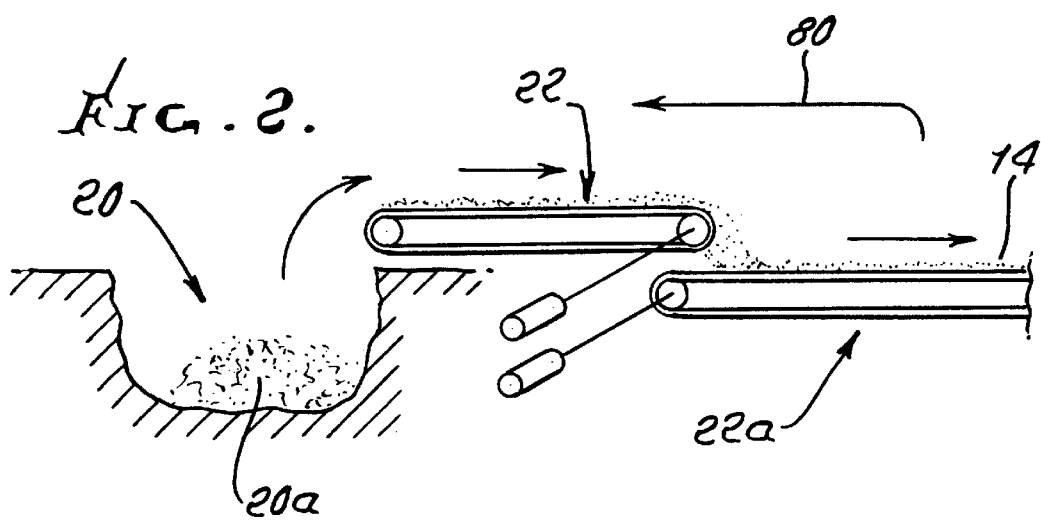
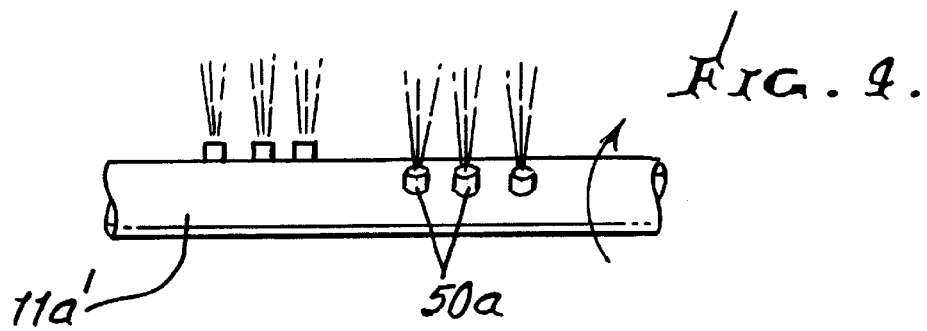
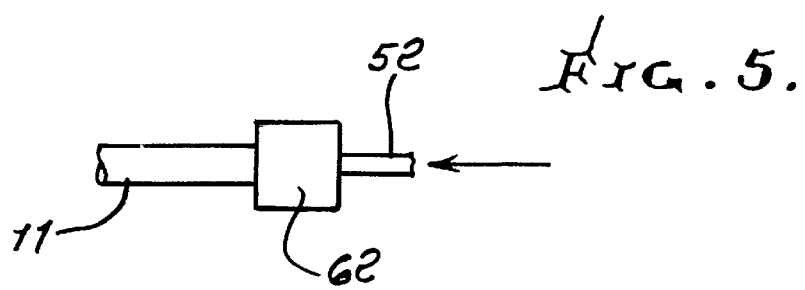
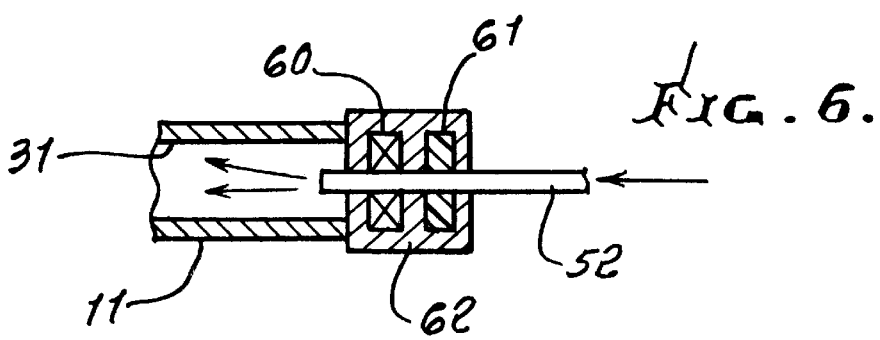

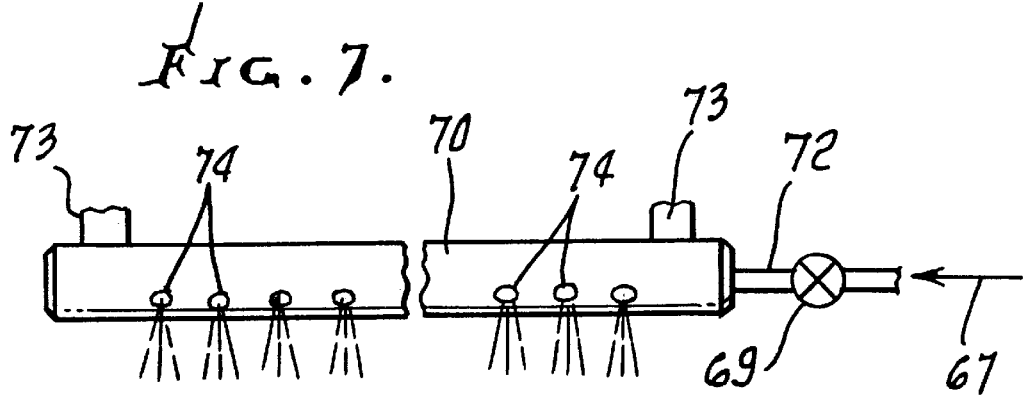
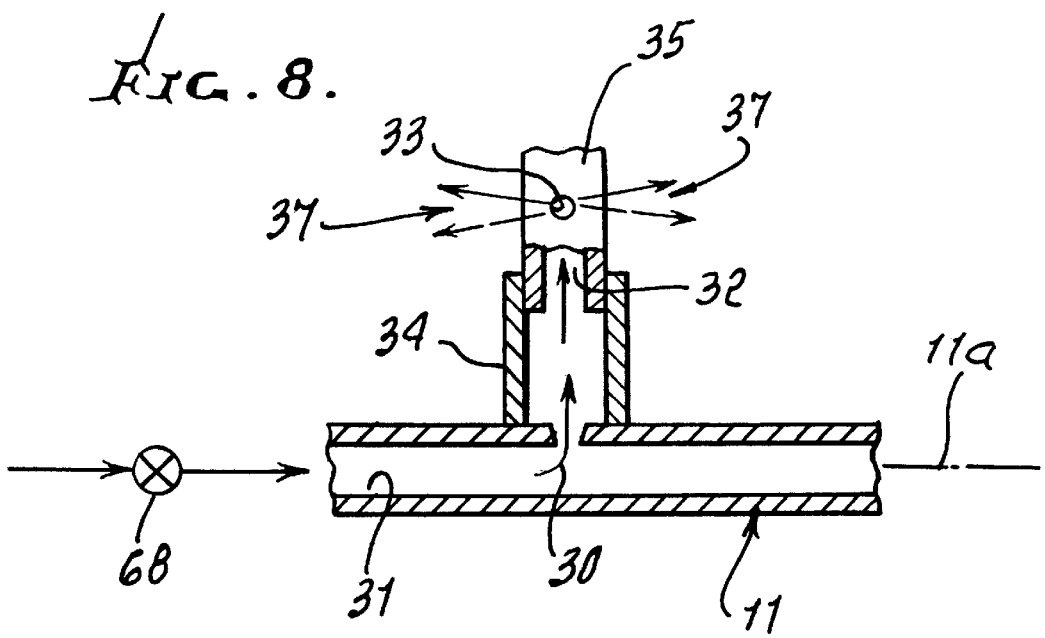

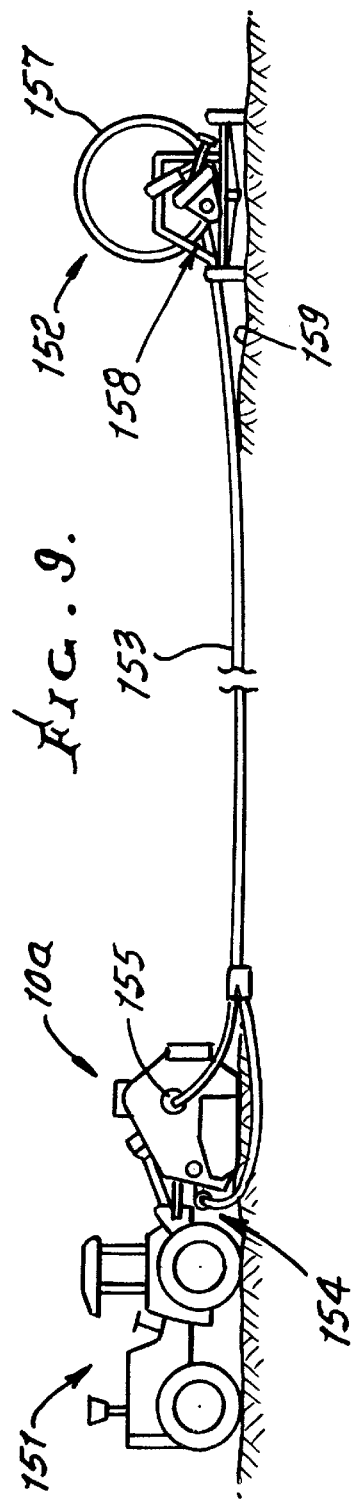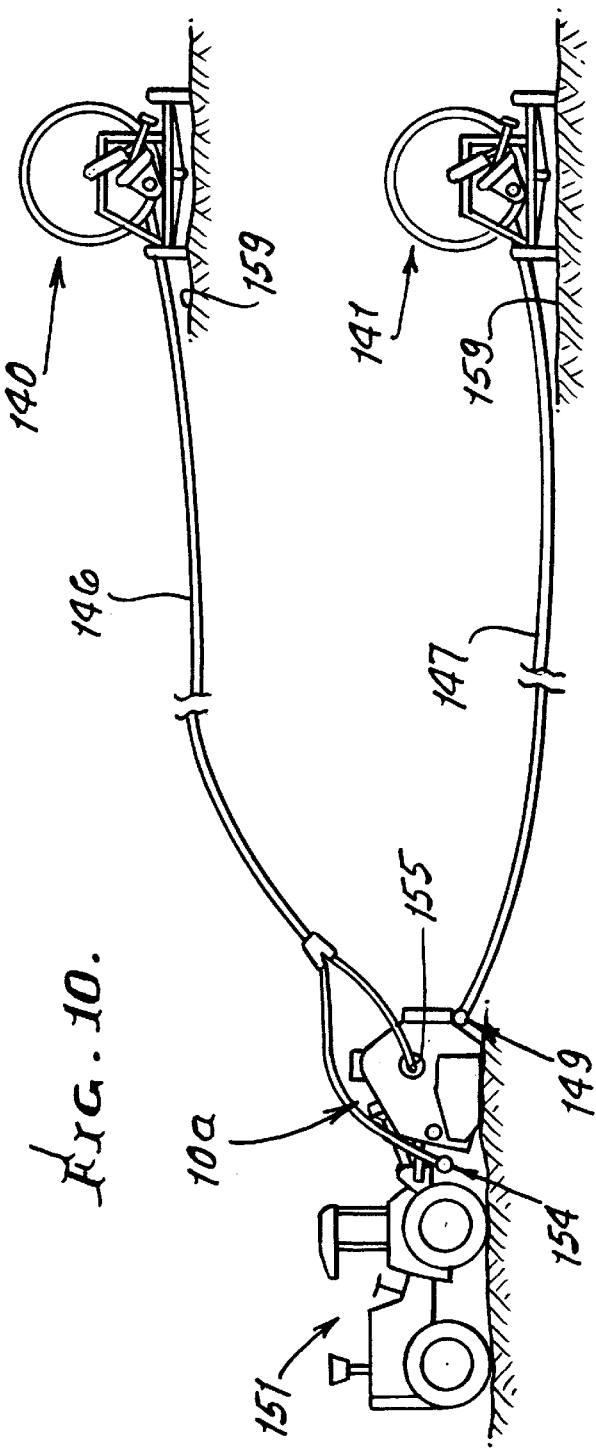

REDUCTION OF SOIL CONTAMINATION

BACKGROUND OF THE INVENTION

This invention relates generally to clean up of hydrocarbon polluted soil and more particularly to dispersing of microbes into hydrocarbon pollutant-containing soil to reduce pollutant levels.

Hydrocarbon pollution occurs in many ways, and areas, among which are the following:

1) spillage into the ground as at gasoline service stations (i.e. from rusted tanks, etc.); and
2) leakage into the ground, i.e. formation, at or near oil wells.

Cleanup of such hydrocarbon pollutants is difficult, time consuming and expensive. While microbes have been employed to consume hydrocarbons, it is difficult to deploy the microbes, accurately and in sufficiently quantity into polluted in situ soil.

There is need for improved methods and apparatus to rapidly and effectively treat soil so as to overcome hydrocarbon pollution in soil.

SUMMARY OF THE INVENTION

It is a major object of the invention to provide improved methods and apparatus to meet the above need. Basically, the improved method of treating hydrocarbon contamination in soil includes the steps:

a) providing and operating a rotary tiller having tilling spaces or elements that rotate into and out of the soil to till and loosen the soil, and to elevate or impel soil upwardly so that loosened elevated soil than drops downwardly, and becomes aerated, b) and dispersing into the soil aqueous streams that contain microbes characterized as reacting with hydrocarbons in the loosened soil to produce $CO_2$ and water, thereby to decontaminate the soil.

Typically, soil to be treated extends generally horizontally, and the rotating tiller is traveled generally horizontally or parallel to the exposed soil surface to progressively till the soil, and also throwing it upwardly for aeration, while the aqueous streams of microbes are dispersed into the loosened and rising or falling soil. The contaminated soil may have originated underground, as for example at a gasoline or hydrocarbon fuel filling station, and such soil is removed and spread out for treatment.

Dispersing of the aqueous streams of microbes may be effected in the path of tiller travel, or at the successive locations of the tiller; and ducting may be provided at tiller rotary arms to be ejected up and down, forwardly and rearwardly, into soil being tilled and rising and falling; and other ducting may be provided in closely spaced relation to the traveling tiller, and from which such aqueous streams of microbes are ejected onto soil to soak the soil being tilled or to be tilled as referred to.

Ducting at the rotating arms typically communicates with the rotary backsides of the arms from which said streams are ejected into the soil being tilled and aerated.

The tiller arms preferably have terminals which extend sidewise or laterally to act as knives or spades and elevators to cut into and elevate soil, aqueous streams being ejected at locations on the arms at spaced locations from such terminals.

A further object includes allowing said microbes to consume the hydrocarbon in the aerated soil, thereby to de-contaminate the soil.

An additional object includes returning the de-contaminated soil to underground locations from which contaminated soil has been removed.

Another object includes rotating the tiller at speeds above 300 to 1000 revolutions per minute, to obtain rapid lifting of the soil, for aeration; and ejecting the microbe streams at pressures above about 100 psi, to obtain sufficient penetration into the soil being tilled and elevated, and added displacement of such soil.

These and other objects and advantages of the invention, as well as the details of an illustrative embodiment, will be more fully understood from the following specification and drawings, in which:

DRAWING DESCRIPTION

FIG. 2 is an elevation showing soil removed from an underground location, and being transported to a site, for treatment;

FIG. 4 is a front elevation showing dispersing of such streams from a rotating axle;

FIG. 5 shows aqueous stream or fluid delivery into an end portion of the axle;

FIG. 6 is a section showing bearing and seal elements at the axle end;

FIG. 7 is a frontal view showing a non-rotary duct or pipe to disperse microbe bearing fluid into the soil, proximate the tiller;

FIG. 8 shows porting in the axle and the tiller arms, to pass fluid;

FIG. 9 is an elevation showing operation of tilling apparatus in relation to a remote source of fluid such as mixed water and soil decontaminant microbes;

FIG. 10 is like FIG. 9, but shows remote sources of fluid or fluids such as mixed water and chemicals, and also catalysts;

DETAILED DESCRIPTION

Figure 1:
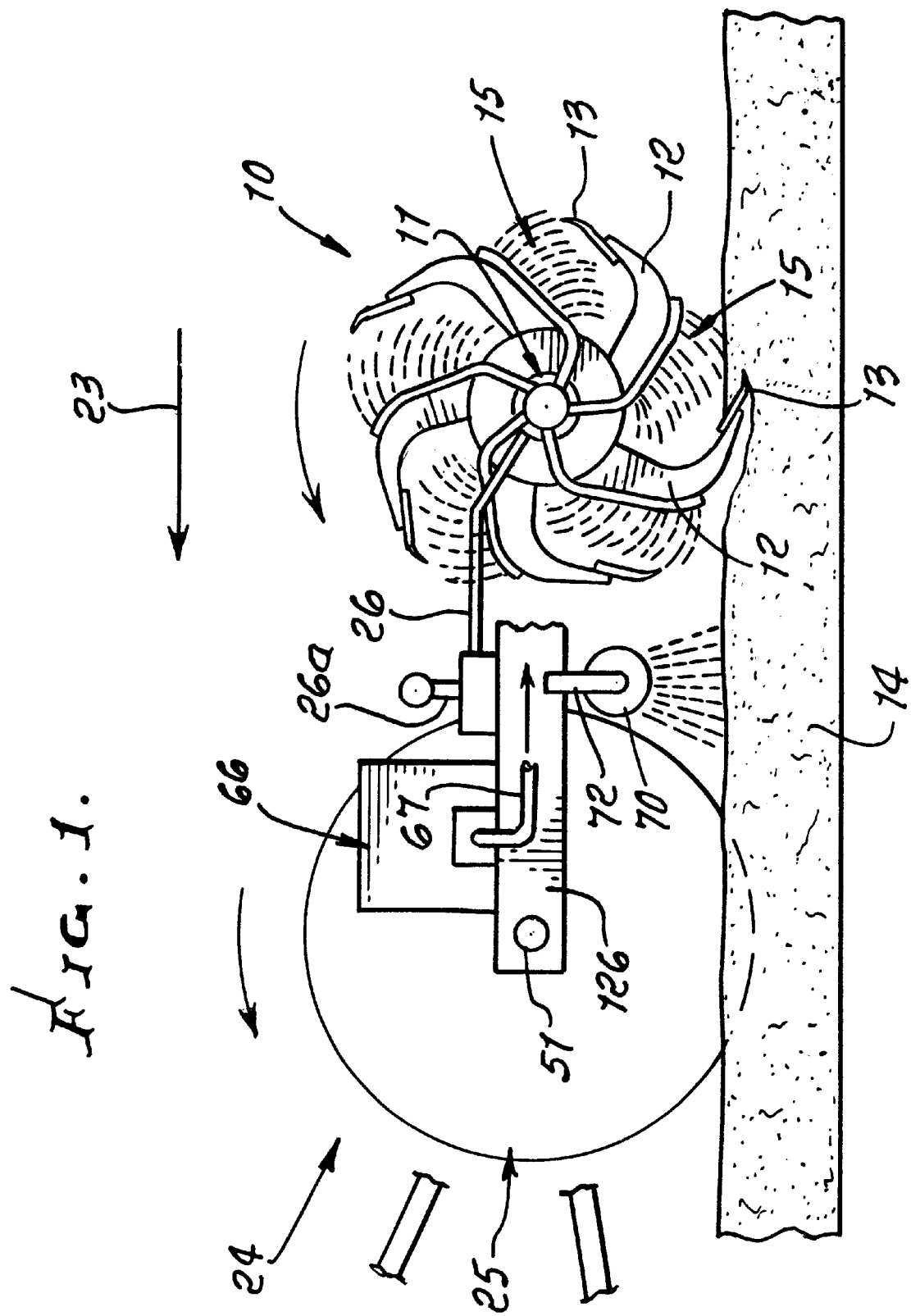
FIG. 1 is a side elevation showing apparatus of the invention treating soil.

FIG. 1 shows a rotary tiller 10 having an axle 11, arms 12 carried by the axle to rotate therewith, and spades or knives 13 carried by the arms to project sidewise or laterally. The angled spades 13 rotate into and out of the soil layer 14 at a speed and depth such that the soil is tilled, loosened, and lifted or elevated as at 15. The loosened and/or elevated soil tumbles or falls downwardly, and the soil is thorough aerated in such manner as to promote oxygen access to aqueous fluid streams or drops being dispersed into the soil. Such aeration assists in reaction of microbes in the fluid with contaminant hydrocarbons in the soil, to form $CO_2$ and water. Efficient decontamination of soil is thereby achieved, as over a period of a few days following such treatment.

FIG. 2 shows hydrocarbon contaminated soil 20 removed from an underground source at 20a, and delivery to a conveyor, or conveyors, 22 and 22a for spreading of the layer 14 referred to in FIG. 1. Source 20a may for example comprise a soil zone adjacent an underground leaking fuel tank at a gasoline filling station, for vehicles. Arrow 80 indicates return of decontaminated soil to 20a.

The tiller 10 in FIG. 1 is traveled in a direction 23, as by a tractor 24 having drive wheels 25. A support 126 is carried by tractor wheel support axle 51, at a controlled elevation relative to the soil layer 14, such that desired depth of travel of the spades 13 in the soil layer is achieved, in relation to tiller travel speed, and tiller rotation angular velocity, for most effective distribution of microbes in the aqueous streams and into the soil, i.e. thorough dispersal into the displaced soil. A power drive in the tiller, to rotate axle 11, is indicated at 26, and may have a speed control at 26a. The weight of support 126 urges the tiller arms and spades into the soil.

FIG. 8 shows delivery at 30 of aqueous streams containing microbes, from the bore 31 of the rotating axle 11 to ducting at 32 and port 33 in an arm carrier or manifold 34, and in a tiller arm 35. Nozzles [36] at ports 33 disperse liquid in spray streams indicated at 37. The axle axis of rotation is seen at 11a. Nozzles are at the sides of the arms that face generally rearwardly, so as not to become clogged with soil.

Figure 3:
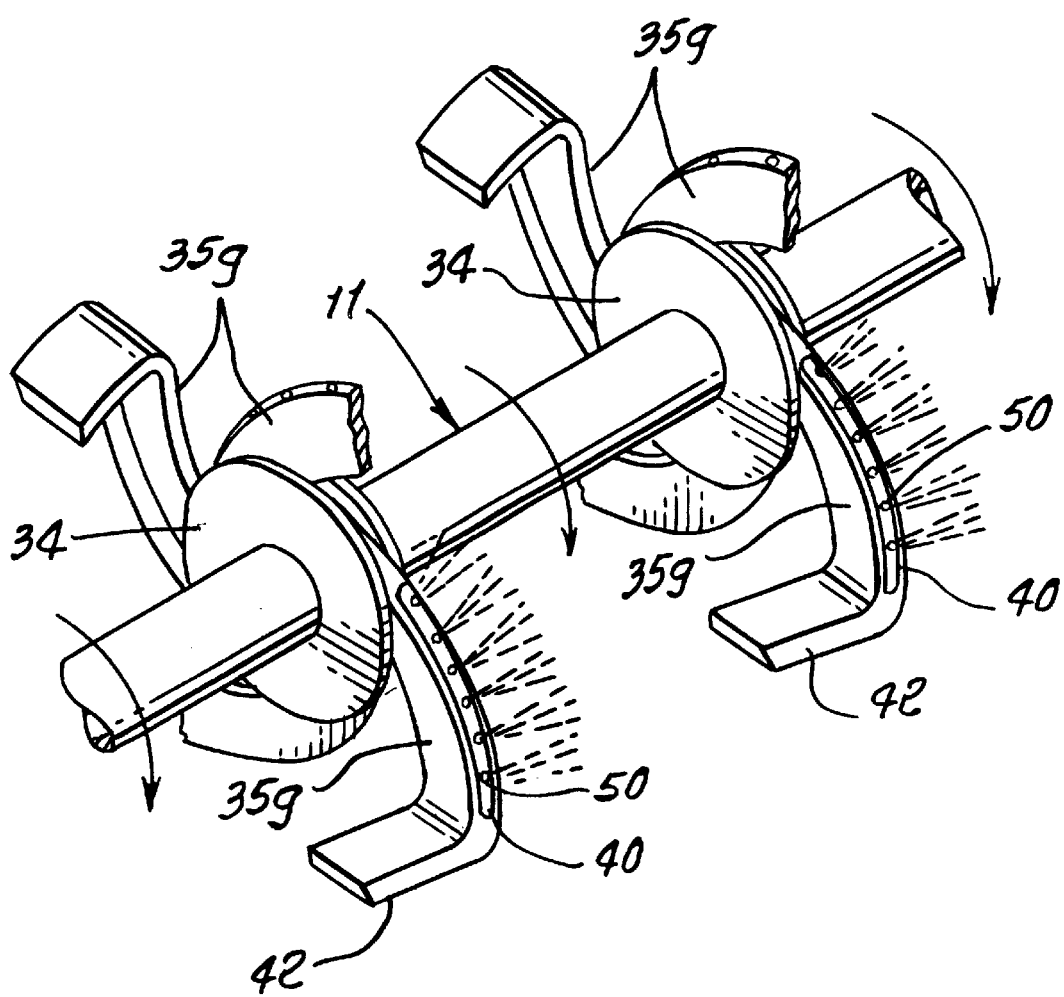
FIG. 3 is a perspective view of tilling apparatus, and showing aqueous streams containing microbes, being dispersed as the tiller rotates.

FIG. 3 shows liquid delivery from the axle 11 to pipes 40 extending at the rear sides of arms 35g, and dispersing of liquid from nozzles 50 at spaced locations along the pipes. Soil cutting and lifting spades 42 are integral with arms 35g, and extend sideward relative to the arm planes of rotation. The FIG. 3 tiller is preferred. FIG. 4 shows liquid delivery from an alternate axle 11a ' to spray nozzles 50a on the axle.

The solution sprayed into the soil consists of a concentrate of naturally occurring microbes (aerobic and/or anaerobic) in water. The solution is prepared by soaking bacteria-containing particles (for example the product known as "WASTE 60" produced by Janco, Inc., St. Louis, Mo.) in water for 1–10 hours to form the concentrate. For example about 120 grams of such particles is soaked in 15 gallons of water. That concentrate is then diluted (100 to 3,500 parts of concentrate to 1,000,000 parts of water) to form the solution that is sprayed. Preferably about 3000 ppm is used.

The microbes employed consist of one or more of the following:

achromobacter
arthrobacter
aspergillus
bacillus
candida
cladosporium
corynebacterium
myrothecium
punicillium
phialophora
pseudomonas
rhodothorula
streptomyces
trichoderma
a blend of aerobic and facultative organisms.

The present method and apparatus avoids need for complex steps and apparatus disclosed in U.S. Pat. No. 5,039, 415, and differs materially therefrom.

Figure 6A:
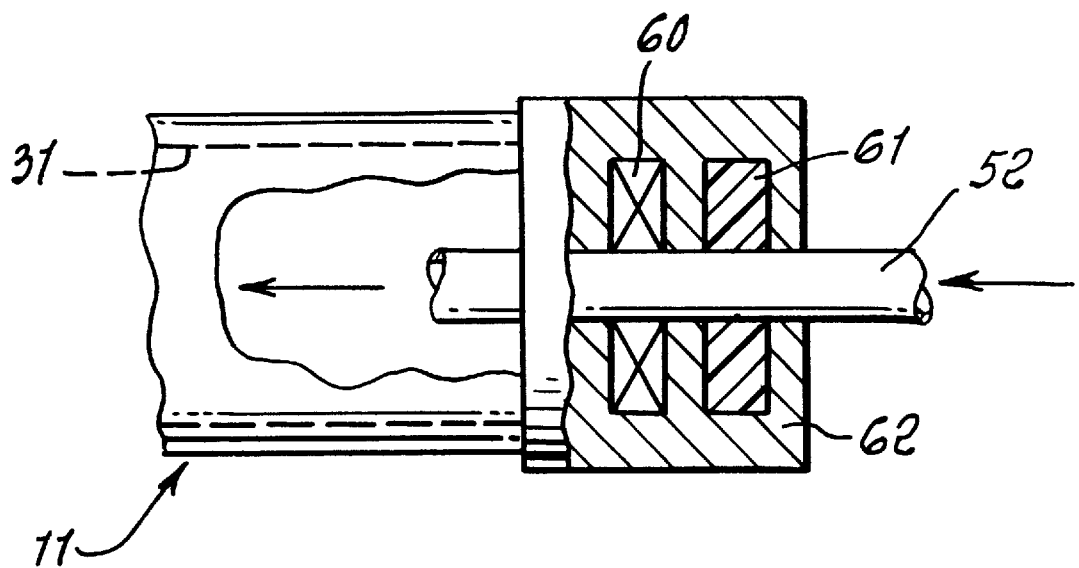
FIG. 6a is an enlarged view of the same.
Figure 6B:
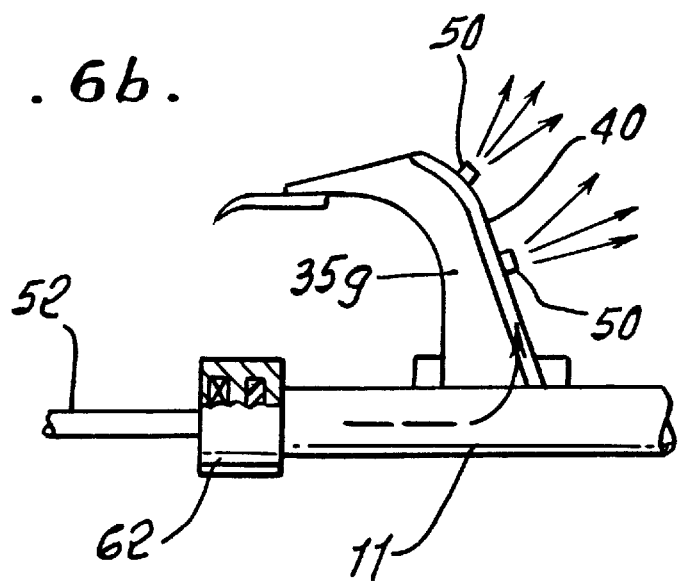
FIG. 6b shows connection of the bearing and seal elements to a rotary axle having a tiller arm.

FIGS. 5 and 6 show rotating bearing and seal members 60 and 61 in a housing 62 that may be used at the junction of a fixed non-rotating liquid delivering pipe 52, (not shown in FIG. 1) and at the end of the rotating axle 11, as described herein. See also FIG. 6a. FIGS. 1 and 7 show an auxiliary duct or pipe 70, which is non-rotating, and which extends near but forwardly of the tiller. Aqueous liquid carrying microbes is also delivered at 72 to pipe 70, and sprayed downwardly from ports or nozzles 74 into or onto the soil, just prior to its penetration and lifting by the rotating spades. Pipe 70 also extends transversely of the path of travel of the tiller, and may extend above the soil, and parallel to the tiller axis of rotation. Supports 73 are connected to 26. Enhanced dispersal of the microbes is thereby achieved. A source (tank and pump) 66 for liquid containing microbes to be delivered at 67 to pipe 70 and to the tiller axle bore 31 is shown in FIG. 1. Valves 69 and 68 control the rates of delivery to the pipe 70 and tiller axle bore 31 respectively.

In a specific example, the following parameters apply:
rate of tiller rotation—about 300 rpm to 1000 rpm
forward travel rate—½ mph to 3 mph
depth of soil being tilled—1½ feet to 4½ feet
liquid pressure at nozzles—100–150 psi
size of nozzle openings—½ inch
numbers of nozzles per tiller arm or space—10
axle diameter—5 to 7 inches Apparatus embodying the invention comprises:
a) a rotary tiller having an axis of rotation, knives that extend generally parallel to said axis to cut into and lift soil being tilled, arms carrying the knives, and nozzles carried by the arms to spray soil decontaminant fluid into the soil being tilled and elevated by the rotated knives,
b) means to travel the tiller above the soil and to rotate the tiller to cause the knives to cut into the lift soil, for aeration and mixing with said fluid,
c) means and supply said fluid under pressure for flow to said nozzles, for forcible spraying into soil particles dropping after elevation.

In FIG. 9, tiller apparatus 10a, for example as described above, is pulled by a tractor 151. A supply means or source 152 is remotely located, to supply mixed water and decontaminant microbes, under pressure, for flow to nozzles at or proximate the tiller apparatus 10a like that at 10 as described above. Such flow is via a flexible hose or conduit 153 extending from 152 to a spray bar 154 and/or a hollow rotary shaft 155 at the tiller, for flow to spray nozzle on 154 or on tiller arms 12, as described above. The tractor and tiller typically travel toward or advance back and forth, and relative to the source 152. A reel 157 at the source apparatus 158 operates to reel and unreel the hose as the tiller travels relatively toward or away form the source, whereby the hose remains taut and the tiller does not entangle with the hose. The unreeled hose length lies on the ground 159 and typically extends to about 1,200 feet maximum. A known machine 152 is identified as a Bauer machine.

FIG. 10 is like FIG. 9, except that sources 140 and 141 are provided, for soil chemicals and water (mixed), and for water and catalyst (mixed), one usable catalyst consisting of peroxide, for reaction with the chemicals as for example ferrous sulfate at the tiller location. Hose 146 extends from source 140 to the tiller spray bar 154 and spade carrying hollow shaft 155 and hose 147 extends from the source 141 to the rear spray bar 149 at the tiller. See also junction 146a. Catalyst sprayed with water from bar 149 contacts the sprayed chemicals, on the tilled earth, to activate them.

If desired, hose 147 can be eliminated, and water and catalyst spayed upwardly and sidewardly from apparatus 141, to fall on the ground tilled or to be tilled by the tiller, to which chemicals (ferrous sulfate) have been supplied, as described. Multiple traveling tillers can be supplied with fluid from a control supply (microbes or chemicals).

Figure 11:
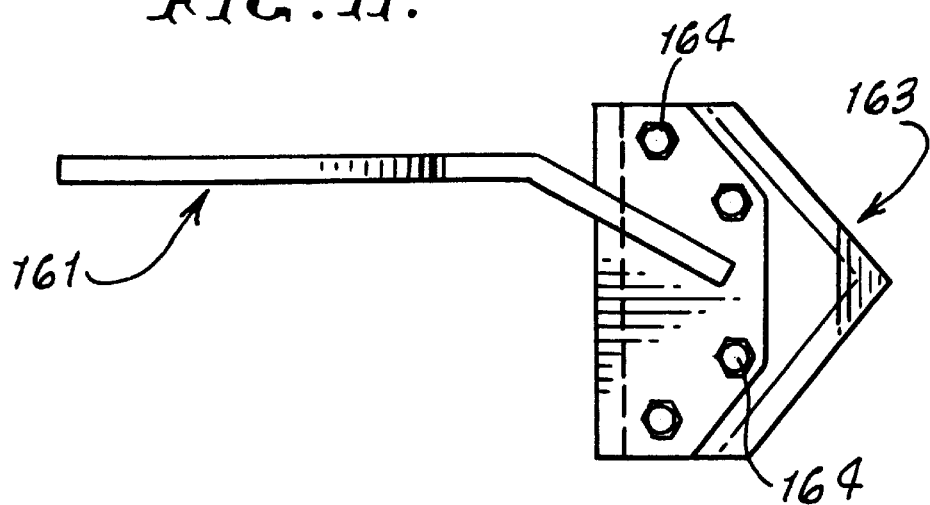
FIGS. 11 and 12 are plan and side elevation views of a modified tiller arm and spade.
Figure 12:
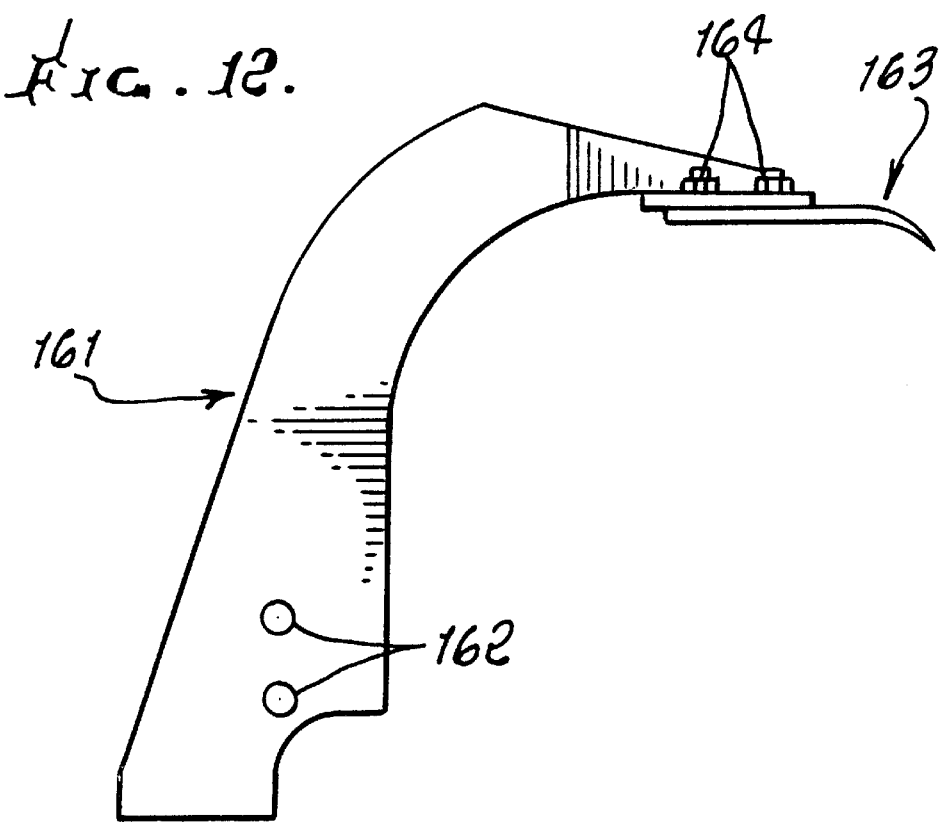

FIGS. 11 and 12 show further details of a modified tiller arm 161, with spray nozzles 162 located on the back side of arm 161. A spade 163 is bolted to the arm 161 at 164, In the above, the reaction of ferrous sulfate and hydrogen peroxide produces, inter alia $CO_2$ and heat, at 20 to 40 degrees Centigrade.

I claim:

1. The method of treating hydrocarbon contamination, in soil, that includes
   a) providing and operating a rotary tiller having tilling elements that rotate into and out of the soil to till and loosen the soil, and to elevate soil upwardly so that loosened elevated soil then drops downwardly, and is aerated,
   b) and dispersing into the soil aqueous streams that contain microbes characterized as reacting with hydrocarbon in the loosened soil to produce $CO_2$ and water, thereby to decontaminate the soil,
   c) and also including the steps:
      i) providing a source of said aqueous streams and relative to which said tiller travels,
      ii) and providing a flexible conduit delivering said aqueous streams from the source toward the tiller for said sub-paragraph b) dispersing.

2. The method of claim 1 wherein the soil to be treated extends generally horizontally, relative to the axis of the tiller, and further including the step of traveling the rotating tiller generally horizontally to progressively till the soil, said dispersing step carried out proximate the traveling tiller.

3. The method of claim 2 wherein said dispensing of said aqueous streams into the soil is effected in one or more of the following modes:
   a) in the path of tiller travel
   b) at the location of the tiller
   c) by providing ducting at tiller arms from which said streams are ejected into the soil being tilled,
   d) by providing a manifold spaced from the tiller and containing ducting from which said streams are ejected onto soil being tilled,
   e) by providing ducting at said rotating arms to communicate with the rotary back sides of the arms from which said streams are ejected into the soil being tilled and aerated,
   f) by ejecting said streams to mix with the soil being elevated and also to wet the soil below the top level thereof,
   g) by ejecting said streams from locations on tiller arms spaced from sidewise extending tiller terminals acting as knives to cut into and elevate the soil.

4. The method of claim 3 wherein the tiller is rotated at about 300 rpm to 1000 rpm.

5. The method of claim 3 wherein the tiller is rotated at above 300 rpm.

6. The method of claim 3 wherein said streams are ejected from the ducting at pressures between about 100 and 150 psi.

7. The method of claim 2 including allowing said microbes to consume the hydrocarbon in the soil, thereby to de-contaminate the soil.

8. The method of claim 7 including returning de-contaminated soil to underground locations from which contaminated soil has been removed.

9. The method of claim 2 wherein tiller arms are provided and along which said streams are ejected into soil being tilled, the tiller carrying supply ducting from which pressurized streams are delivered to said ducting, at the tiller arms.

10. The method of claim 1 wherein the soil originates from a location where it has been hydrocarbon contaminated in situ, and including removing the in situ soil and spreading it for progressive tilling by the tiller.

11. The method of claim 1 wherein the microbes are selected from one of the following:
    achromobacter
    arthrobacter
    aspregillus
    bacillus
    candida
    cladosprium
    corynebacterium
    myrothecium
    nocardia
    punicillium
    phialophora
    pseudomonas
    rhodothorula
    streptomyces
    trichoderma
    a blend of aerobic and facultative organisms.

12. The method of claim 1 including providing a reel proximate said source operating to reel and unreel the conduit as the tiller travels relatively toward and away from the source.

13. The method of treating hydrocarbon contamination in earth, which includes
    i) spraying chemicals onto earth that is being progressively tilled
    ii) spraying water and catalyst onto the earth onto space which said chemicals have been sprayed,
    iii) and including flowing the chemicals to a tiller, to be sprayed, via a flexible conduit, and reeling and unreeling the conduit during tiller traveling.

14. The method of claim 13 including operating multiple such tillers and conduits, simultaneously.

* * * * *